United States Patent [19]

Hirt et al.

[11] 4,334,718
[45] Jun. 15, 1982

[54] COUPLING BEARING FOR ROTORS ABOVE CRITICAL SPEED

[75] Inventors: Dieter Hirt, Augsburg; Richard Steigenberger, Friedberg; Peter Meinke, Grossinzemoos, all of Fed. Rep. of Germany

[73] Assignee: Maschinenfabrik Augsburg-Nurnberg Aktiengesellschaft, Munich, Fed. Rep. of Germany

[21] Appl. No.: 177,803

[22] Filed: Aug. 13, 1980

Related U.S. Application Data

[63] Continuation of Ser. No. 886,916, Mar. 10, 1978, abandoned.

[30] Foreign Application Priority Data

Mar. 14, 1977 [DE] Fed. Rep. of Germany ....... 2711065

[51] Int. Cl.³ .............................................. F16C 39/06
[52] U.S. Cl. ....................................... 308/10; 308/26; 464/180
[58] Field of Search ..................... 308/10, 1 A, 35, 26, 308/33, 177, 188; 310/90, 157, 51; 64/1 V; 74/574

[56] References Cited

U.S. PATENT DOCUMENTS

| | | | |
|---|---|---|---|
| 3,676,723 | 7/1972 | Drucker | 310/157 |
| 3,771,909 | 11/1973 | Rousseau | 308/10 |
| 3,807,813 | 4/1974 | Milligan | 308/10 |
| 3,810,683 | 5/1974 | Keever | 308/10 |
| 3,856,200 | 12/1974 | Lieb | 308/10 |
| 4,036,565 | 7/1977 | Becker | 308/10 |
| 4,196,946 | 4/1980 | Lipscomb | 308/10 |

*Primary Examiner*—R. Skudy
*Attorney, Agent, or Firm*—Scully, Scott, Murphy & Presser

[57] ABSTRACT

A coupling bearing for rotors running above critical speed, in which the bearing encloses the rotor and is connected and disconnected depending on radial rotor movements. A gap is provided between the coupling bearing and the rotor, and this gap has a predetermined space width which is at least as large as the maximum amplitude of the rotor in the nominal operating range. A starting bushing permits brief sliding of contacting surfaces, and is made of a highly wear-resistant and self-lubricating material of low heat conductivity. The starting bushing, furthermore is ball bearing mounted. The coupling bearing is in the form of a ball bearing connected with a damping device, and the inner race of the ball bearing seats the starting bushing. The inner race and the balls of the bearing are made of material of low specific gravity, high heat conductivity and high temperature resistance. The inner and outer races of the ball bearing, moreover, are made of light-weight material containing a temperature-resistant lubricant, and the outer race of the ball bearing is contained in a damper body of high heat conductivity.

7 Claims, 3 Drawing Figures

COUPLING BEARING FOR ROTORS ABOVE CRITICAL SPEED

This is a continuation of application Ser. No. 886,916 filed Mar. 10, 1978 now abandoned.

BACKGROUND OF THE INVENTION

The present invention relates to a coupling bearing for rotors running above critical speed, with the bearing enclosing the rotor and being connected and disconnected depending on radial rotor movements.

In the attempt to operate in the turbine, compressor and related fields with rotors of continuously increasing speeds, nominal speed ranges have been reached which are above the critical speed for bending of the rotor. Attempts have been made to push the rotor through the critical speeds by starting it with intensified driving force. This has been successful only with very well balanced rotors, so that the emphasis of stabilizing efforts is concentrated on bearing technology. In this connection, the so-called coupling bearing is gaining increased importance.

During quiet running of the rotor, coupling bearings do not perform a bearing function; they start to operate only at higher vibration amplitudes by being mechanically coupled as a result of rotor deflections.

A coupling bearing, in contrast with the usual damping bearings carrying and supporting the rotor, acts as an auxiliary bearing by entering action only for short periods, when the critical speed ranges are being used.

While the rotor starts to run in the coupling bearing, energy is withdrawn from the rotor via the damper connected to the coupling bearing, and the natural frequency of the system is changed by coupling the coupling bearing mass. Due to both circumstances, the rotor cannot deflect unduly, and as the rotor speed increases, the rotor leaves the critical range earlier.

The effectiveness of a coupling bearing depends on various factors among which are the point in time when the bearing takes over and its response readiness.

Other requirements on a coupling bearing are made in view of the required high rotary speeds of the rotors. It is necessary that the drive energy withdrawal be kept as low as possible. For this reason, the coupling bearing-rotor system should have no friction during the periods between the critical speeds, particularly in the nominal range, and should have low friction during use of the bearing.

It is, therefore, an object of the present invention to provide a coupling bearing of the above-described type which, besides a very short response time, ensures frictionless free-running of the rotor.

Another object of the present invention is to provide a coupling bearing of the foregoing character which is substantially simple in construction and may be economically fabricated.

A further object of the present invention is to provide a coupling bearing, as described, which may be readily maintained in service and which has a substantially long operating life.

SUMMARY OF THE INVENTION

The objects of the present invention are achieved by providing that between the coupling bearing and the rotor there is a defined or predetermined gap which is at least as large as the maximum amplitude of the rotor in the nominal operating range.

During running at a critical speed, the rotor is coupled to the coupling bearing only after bridging the predetermined air gap, ensuring contact-free free-running of the rotor and early action of the damper in the critical ranges.

Ordinarily, during coupling of the coupling bearing, the rotor causes a mass to rotate. The friction losses occurring during this acceleration process can be reduced to a minimum with a movably mounted butt (starting) bushing which permits a brief sliding of the surfaces contacting each other. For this purpose, a starting bushing made of a highly wear-resistant, self-lubricating material of lower thermal conductivity may be provided.

According to an embodiment which is simple to manufacture, the coupling bearing is constructed as a ball bearing connected to a damping device; the starting bushing is inserted in its inner ring (race) and the balls of the bearing are made of a material of low specific gravity. To conduct the heat, arising from the unavoidable residual friction, to housing segments or, when hydrostatic damping devices are provided, to the damper fluid, it is preferable to make the parts constituting the coupling bearing and the damper portions connected to the bearing of material of high thermal conductivity.

According to another embodiment of the present invention, the coupling bearing may be made of several rotary-mounted steel sleeves to reduce the peripheral speed. The steel sleeves may be either floating or arranged in several ball races.

The coupling bearing centering, ensuring safe free-running, may be supported by two permanent magnets, associated with the rotor and the coupling bearing.

Furthermore, additional active magnetic bearings may be provided to assist in the damping of undercritical and overcritical motor irregularities and which are incorporated into the damper body to ensure the midpoint-centering of the coupling bearing.

With rotors which have a bearing on one end and where the coupling bearing is located in the area of this bearing, it is advantageous if the end bearing with its damper is integrated in the damper coupling bearing, providing an increased assurance of exact midpoint centering.

The centering of the coupling bearing in the housing which does not participate in the rotation can be achieved by mechanical spring elements or an elastic sealing bellows or by permanent magnets.

The dynamic behavior and the bearing stress can be optimized by reducing the mass (or dimensions) of all parts constituting the damper coupling bearing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
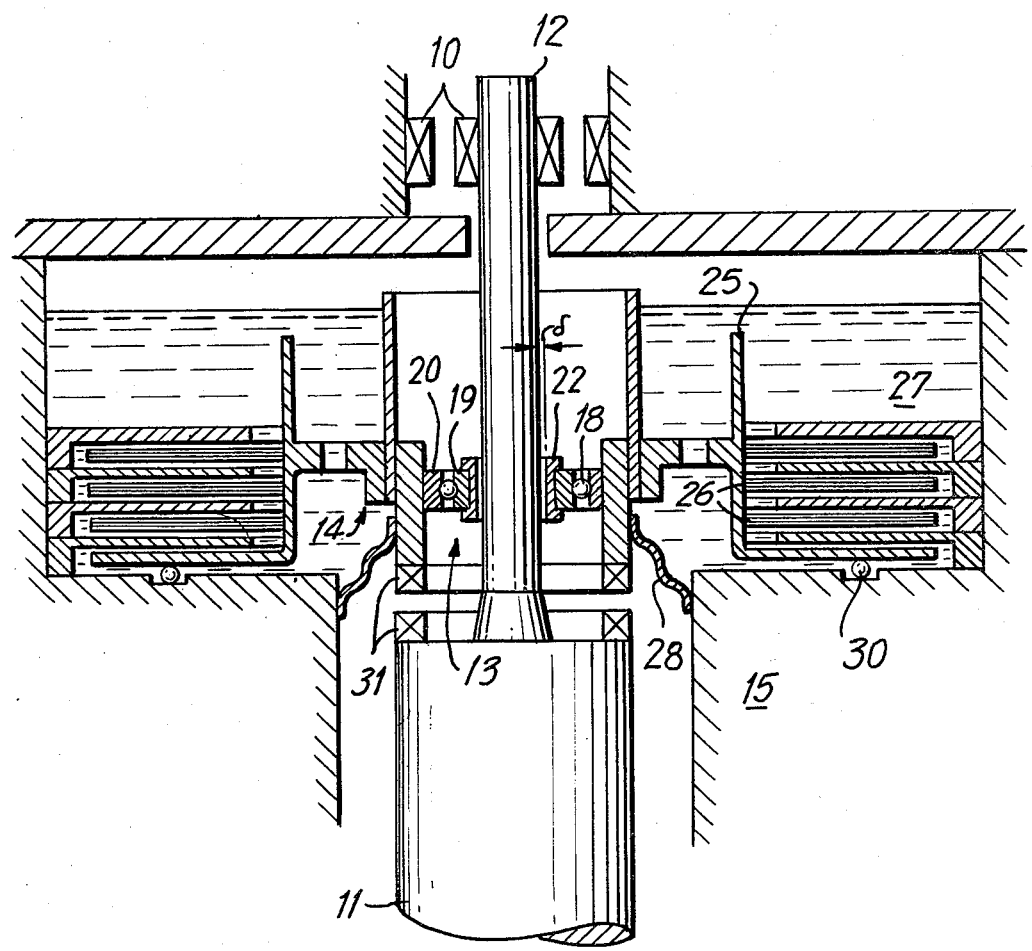
FIG. 1 is a sectional view and shows a coupling bearing enclosing a rotor mounted with ring magnets, in accordance with the present invention.

FIG. 1 shows a the rotor 11 is supported by magnetic bearings 10; and having the form of a shaft. Around the rotor shaft 12 is a coupling bearing 13 which is mounted with a damping device 14 in rotor housing 15. The coupling bearing 13 comprises inner and outer races 19 and 20 with balls 18. The sliding contact piece for the rotor shaft 12 is a starting bushing 22 connected to the inner race 19; this bushing is made of a self-lubricating material.

The coupling bearing 13 is fastened by the outer race 20 to a damper sleeve 25 of the damper device 14. The damping capacity is supported by several damper disks 26 which are immersed, together with the damper sleeve 25, in a damping liquid 27. A diaphragm 28 seals the space filled with damping liquid between the damping device 14 and the housing 15.

The integrated damper-coupling-bearing combination 13, 14 is movably supported on balls 30 while the centering is provided by the spring-like diaphragm 28. Magnet rings 31 associated with the damper coupling bearing and the rotor 11 assist the centering function of the bearing, to ensure that during normal operation of the rotor any contact between the shaft 12 and the coupling bearing 13 is prevented.

During normal operation of the rotor 11, the damping bearings carrying the rotor provide for the stabilization of the rotation system. (Only the magnet bearing 10, one of the bearings is shown). All vibrations occurring in the normal nominal range and the vibrations at relatively lower rotor amplitudes during the running up and running down of the rotor speed are handled by this damping system which may be actively or passively magnetic, hydraulic or mechanical or a combination of these systems while the damper coupling bearing 13, 14 stands by inactively. The coupling bearing which is located as far as possible away from vibration nodal points surrounds the rotor or the rotor shaft 12 with the starting bushing 22, maintaining an air gap which is slightly larger than the normal rotation deviation of the rotor during nominal operation so that any contact between the rotor and the coupling bearing is prevented. By means of the centering devices, for example, the magnet rings 31 and/or a spring diaphragm 28, the gap can be dimensioned slightly above the normal rotor amplitude at the coupling bearing location so that free running of the rotor is assured. On the other hand, the coupling bearing can quickly go into action as soon as the rotor 11 vibrates more. As soon as the rotor amplitude exceeds the value δ, the shaft 12 strikes the starting bushing. Due to the sliding ability of the material of the starting bushing, the moment of inertia of the accelerated mass is overcome with minimum energy loss, and the movable parts of the coupling bearing 13 are accelerated to a predetermined speed. Now the inertial system receives a new holding characteristic by coupling the damper 14 and the spring diaphragm 28 changing the natural frequency of the system. The vibration energy produced until then is withdrawn via the damping device so that the vibration system quickly stabilizes and the coupling bearing is decoupled again by means of centering magnets 31 and the rotor can run free again after a brief coupling of the damper coupling bearing.

Figure 2:
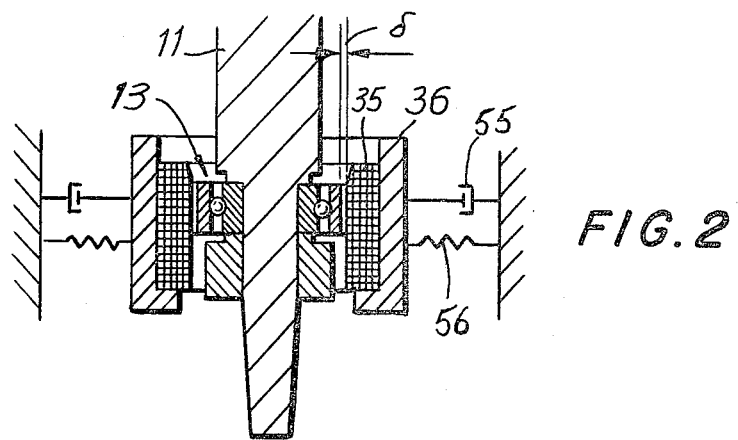
FIG. 2 is a sectional view and shows a coupling bearing with rotating parts connected to the rotor, and an air gap between the bearing and starting bushing.

The arrangement of the coupling bearing may also be in the reverse order, i.e., the rotating parts of the coupling bearing are connected to the rotor while the starting bushing 35 is associated with the damping device 36, FIG. 2. In this case, instead of one bearing component being positively accelerated, the outer ring is braked. Also, one may use a bearing arrangement according to FIG. 1, but connected to the starting bushing on rotor shaft 12, allowing reduction of the mass to be accelerated.

Figure 3:
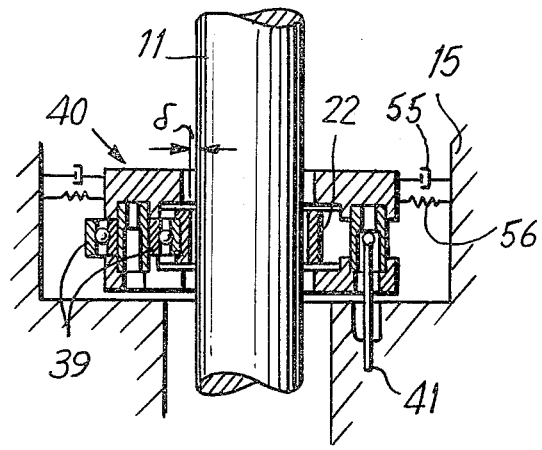
FIG. 3 is a sectional view and shows an embodiment with a damper-bearing system centered by spring rods.

With bearing locations of the rotor of low diameter, as shown in FIG. 3, the starting bushing can be mounted in several concentric small ball bearings 39. In this embodiment, the damper bearing system 40, 39 is centered with spring rods 41 whose one end is fastened to housing 15.

In FIGS. 2 and 3, the damper 55 and spring 56 are part of the damping devices 36 and 40, respectively, and are connected to the housing 15.

A reservoir 48 for supplying lubricant to the coupling bearing may be provided. This lubricant is received in the inner race of the ball bearing or in the ball cage.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should be and are intended to be comprehended within the meaning and range of equivalents of the following claims.

What we claim is:

1. An auxiliary bearing mechanism for stabilizing a substantially vertical rotor undergoing radial deflections due to vibration amplitudes produced at speeds at which bending of the rotor takes place, said mechanism comprising a stationary housing; a bearing element supported by said housing and surrounding said rotor and defining with said rotor an annular gap having a radial width at least equal to the maximum radial deflection of said rotor above said speeds at which bending of the rotor takes place; a damping device associated with said bearing element; spring means connecting said bearing element to said housing for centering said bearing element relative to said housing; and two axially spaced magnet rings, one magnet ring encircling said rotor and supported by said bearing element and the other magnet ring attached to said rotor, said magnet rings preventing by mutual interaction contact between said rotor and said bearing element at speeds other than those at which bending of the rotor takes place.

2. An auxiliary bearing mechanism for stabilizing a substantially vertical rotor undergoing radial deflections due to vibration amplitudes produced at speeds at which bending of the rotor takes place, said mechanism comprising a stationary housing; a bearing element supported by said housing and surrounding said rotor and defining with said rotor an annular gap having a radial width at least equal to the maximum radial deflection of said rotor above said speeds at which bending of the rotor takes place; a damping device associated with said bearing element; elastic diaphragm means connecting said bearing element to said housing for centering said bearing element relative to said housing; and two axially spaced magnet rings, one magnet ring encircling said rotor and supported by said bearing element and the other magnet ring attached to said rotor, said magnet rings preventing by mutual interaction contact between said rotor and said bearing element at speeds other than those at which bending of the rotor takes place.

3. A bearing mechanism as defined in claim 1 or 2 including a starting bushing mounted on the inner surface of said bearing element adjacent but not touching said rotor for permitting brief relative sliding contact between the rotor and the bearing element, said starting bushing being of substantially high wear-resistant and self-lubricating material of low heat conductivity.

4. A bearing mechanism as defined in claim 3, wherein said bearing element includes damping means; and a ball bearing connected with said damping means; said ball bearing having an inner race seating said starting bushing.

5. A bearing mechanism as defined in claim 4, wherein said inner race and the bearing balls of said bearing are of a material of low specific gravity, high heat conductivity and substantially high temperature resistance.

6. A bearing mechanism as defined in claim 4, wherein said ball bearing has innert and outer races comprised of lightweight material containing a temperature-resistant lubricant.

7. A bearing mechanism as defined in claim 4 wherein said damping means includes a damper member of high heat conductivity and said ball bearing has an outer race contained in said damper member.

* * * * *